(12) United States Patent
Möster et al.

(10) Patent No.: US 6,481,058 B1
(45) Date of Patent: Nov. 19, 2002

(54) ACCESSORY FOR A PORTABLE APPARATUS

(75) Inventors: Erik Möster; Matti Siivola; Sören Just-Pedersen, all of Malmö; Peter Södergren, Helsingborg; Carl-Magnus Hansson; Gustav Fagrenius, both of Lund; Fredrik Palmqvist, Staffanstrop, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 34 days.

(21) Appl. No.: 09/645,647

(22) Filed: Aug. 24, 2000

(30) Foreign Application Priority Data

Aug. 24, 1999 (SE) .................................. 9902979

(51) Int. Cl.⁷ ............................................... A44B 21/00
(52) U.S. Cl. ..................................................... 24/3.11
(58) Field of Search ............................... 24/3.12, 3.11; 224/668, 269, 272

(56) References Cited

U.S. PATENT DOCUMENTS

| | | | |
|---|---|---|---|
| 4,111,343 A | * | 9/1978 | Selinko |
| 4,584,250 A | * | 4/1986 | Hooke et al. |
| 5,385,282 A | | 1/1995 | Chen |
| 6,233,789 B1 | * | 5/2001 | Douglas |

FOREIGN PATENT DOCUMENTS

| | | |
|---|---|---|
| DE | 29723296 | 5/1997 |
| GB | 2299480 A | 10/1996 |

* cited by examiner

*Primary Examiner*—James R. Brittain
(74) *Attorney, Agent, or Firm*—Burns, Doane, Swecker & Mathis, L.L.P.

(57) ABSTRACT

A portable apparatus has a housing with a retractable clip device that detachably attaches the apparatus to an external object, such as a belt or a pocket. The clip device includes a clip and an arm, pivotally connected with each other and the housing, and a biassing device that permits the clip device to move when a locking device has released the clip device.

6 Claims, 4 Drawing Sheets

ACCESSORY FOR A PORTABLE APPARATUS

This application claims priority under 35 U.S.C. §§ 119 and/or 365 to 9902979-5 filed in Sweden on Aug. 24, 1999; the entire content of which is hearby incorporated by reference.

BACKGROUND

The present invention relates to a portable apparatus equipped with a retractable clip device for detachably attaching a housing of the apparatus to an external object such as a belt or pocket. The clip device comprises biasing means that creates a clamping force when the apparatus is attached to the object.

In a portable apparatus as defined above, such as a mobile telephone, the most common way of attaching the portable apparatus to an external object is to use a clip contained in a housing of the apparatus. When the apparatus has to be attached to an external object, the clip is manually pulled out a certain length until a sufficient distance between the clip and the housing of the apparatus is reached, thereby making it possible for the clip to be thread onto the external object. Such a clip arranged on an apparatus is disclosed in DE-U1-297 23 296.

Another solution is to use an external pouch, in which the portable apparatus can be put and which instead of the apparatus is equipped with the clip for fastening the pouch together with the portable apparatus onto the belt or pocket.

A clip according to the prior art is often made in one piece and has to be placed on the upper part of the apparatus so that the torque created, when the clip is located far from the centre of gravity of the apparatus, will not affect the human body in a uncomfortable manner.

The main problem with the first state-of-the-art solution is that the clip is difficult to release by using only one hand, and that the clip has to be pulled out a certain distance in order to make the attachment possible.

This means that the user will, in most cases, have to use both hands to release and pull out the clip. The problem with the second solution is that the apparatus has to be put into the pouch before the clip can be used, which is time consuming and unpractical. The pouch together with the apparatus also makes it bigger, thereby increasing the risk of getting stuck with the apparatus.

SUMMARY OF THE INVENTION

The main object of the present invention is to remedy the disadvantages of the prior art solutions described above.

This object is achieved for a portable apparatus of the kind defined above in that the clip device consists of a clip and an arm, which at its lower end is pivotally connected to the housing of the apparatus and at its upper end is pivotally connected to the clip, and that the biasing means, in the form of a spring, is arranged at the pivotal connection between the clip and the arm for biasing the clip into contact with the portable apparatus.

By providing a portable apparatus with an attachment device, such as the clip device according to the invention, the following advantages are obtained: two hands are free to be used and the difficulties in practical handling when manually releasing, attaching or locking the clip are remedied, and the problem with a fixed protruding clip pressing against an object or a part of the user's body is also solved.

Other objects, features and advantages of the present invention are disclosed in the subsequent detailed disclosure, and in the drawings as well as in the appended claims.

BRIEF DESCRIPTION OF THE DRAWINGS

The present invention will now be described in further detail, reference being made to the accompanying drawings, in which.

DETAILED DESCRIPTION

Figure 1:
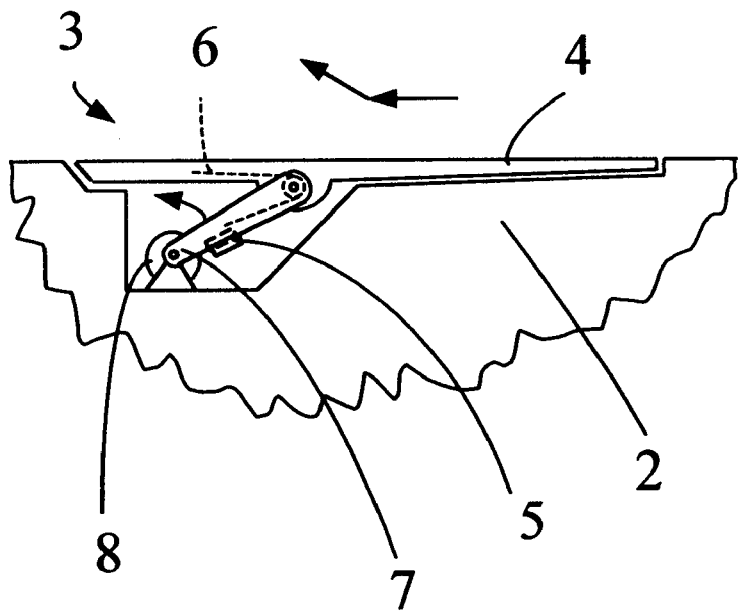
FIG. 1 is a partial side view showing a retractable clip device according to a preferred embodiment of the invention in a first retracted/locked position.
Figure 2:
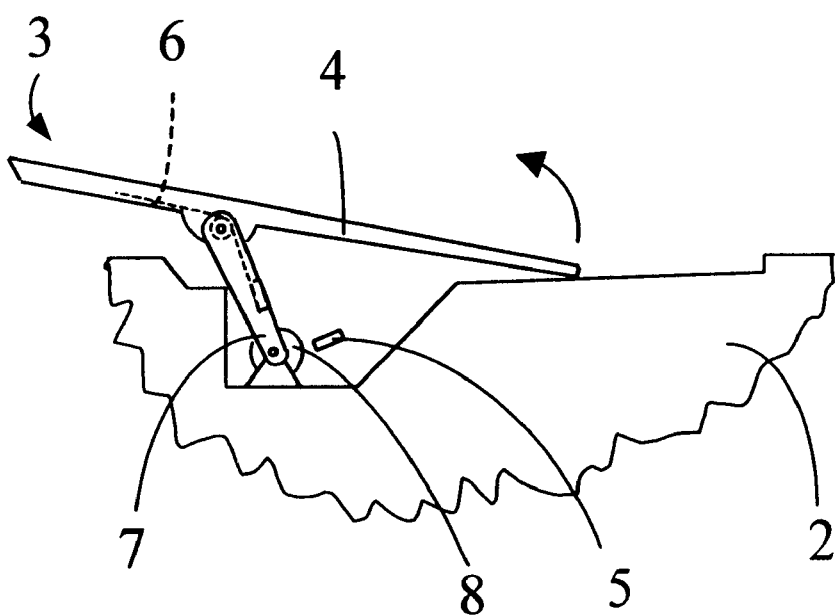
FIG. 2 is a partial side view showing the clip device of FIG. 1 in a second position for usage, i e in a released position.
Figure 5:
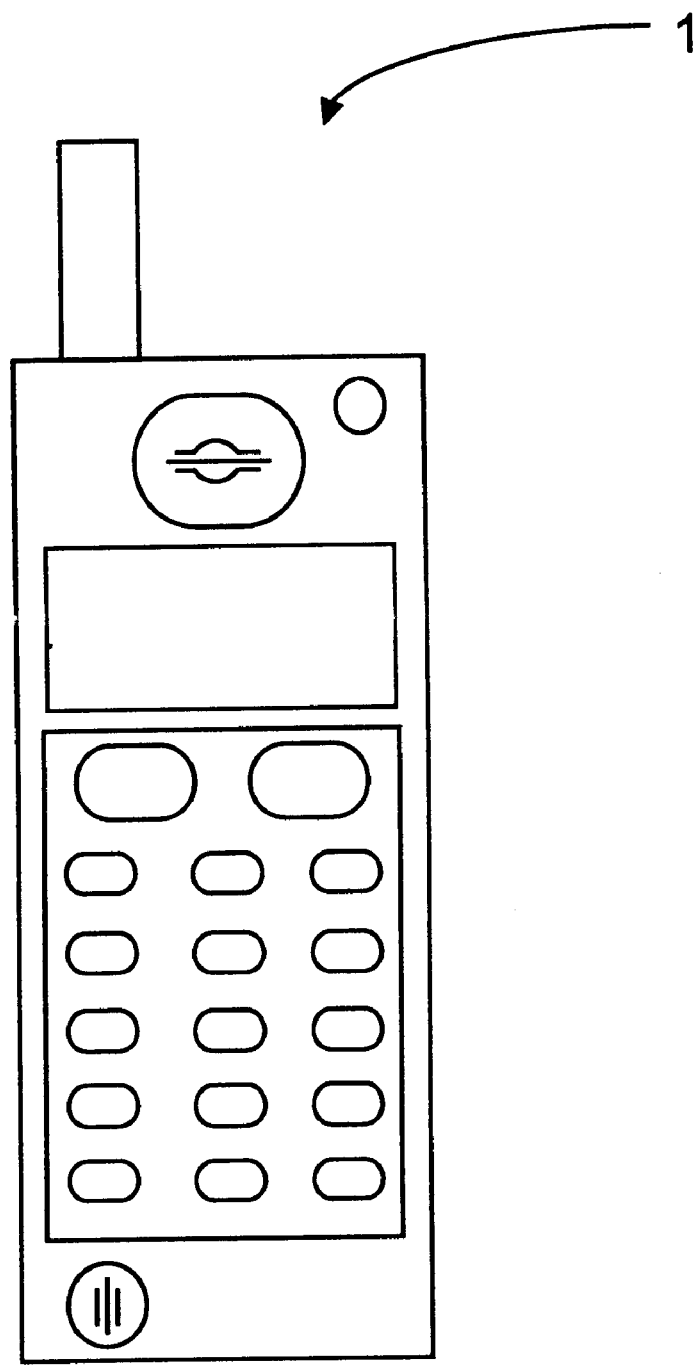
FIG. 5 is a front view of an example of a portable apparatus.

FIGS. 1 and 2 illustrate a preferred embodiment of means for simplifying the releasable attachment of an apparatus 1 to an external object. Preferably, the apparatus 1 is a radio telephone, such as a mobile or cellular telephone, as is shown in FIG. 5. The apparatus has a retractable clip device 3, located on a housing 2 of the apparatus 1 and consisting of a clip 4 and an arm 7, a locking device 5, which locks or releases the clip device 3 depending on its position, and biasing means 6 in the form of a spring.

The clip 4 is connected to the housing 2 by an arm 7 that is pivotably attached at its lower end to the housing 2 and at its upper end to the clip 4. The arm 7 is pivotally joined to the clip 4 by an axle at its upper end and likewise pivotally joined to the housing 2 by another axle placed at the lower end of the arm 7. When the clip 4 is in its retracted position as seen in FIG. 1, the arm 7 is placed in its whole length in a cavity below the surface of the housing 2, whereby the clip 4, preferably flush with the surface, covers the cavity and gives an even exterior to the housing 2.

In FIG. 2, with the clip device 3 in its released position, the arm 7 has rotated counter-clockwise around the axis of rotation at the bottom of the cavity and the clip 4 has moved, due to a pivot motion caused by the spring 6, out of the cavity of the housing 2, until the arm 7 stops against an edge of the cavity. The spring 6 is preferably arranged on the axle, which connects the clip 4 with the arm 7. The spring 6 is of the type helical spring or screw spring. At the ends of the spring 6, the extremities of the spring thread extend tangentially a certain length, so that the thread is in contact with the clip 4 and the arm 7. After the spring 6 has been mounted, the extremities of the spring thread press against the clip 4 and the arm 7 due to a prestress of the spring 6. This gives two functions for the spring 6: the first is to move the clip 4 away from the first closed or locked position, when it is released by the locking device 5, and the second function is to create a clamping force that secures the attachment of the clip 4, in a second position, when it is thread onto an external object, such as a belt or a pocket. In FIGS. 1 and 2 the locking device 5 is only schematically shown for clarity reasons. The locking device 5 can be seen more in detail in FIGS. 3 and 4.

FIG. 1 illustrates the clip device 3 in its first locked/closed position. The locking device 5 locks the clip device 3, and the spring 6 is prestressed so as to be ready to move the clip 4 to the position for usage, shown in FIG. 2. The arrows, shown near the clip 4 and the arm 7 in FIG. 1, indicate the directions of movement when the clip device 3 is released.

In the situation shown in FIG. 2, the locking device 5 has released the clip device 3, and the clip 4 has been moved by the spring 6 from the closed position in FIG. 1 to the opened position for usage. When the clip 4 is to be thread onto an external object, the left end of the clip 4 is pressed down, thereby causing the right end of the clip 4 to be lifted, as indicated by the arrow, until the distance between the right end and the housing 2 is sufficient for threading the clip 4 onto the external object.

The arm 7 and the pivotal connection to the housing 2 can be equipped with a damper 8. The damper 8 could, for instance, be a circular oil damper with a fixed and a moving part with a viscous fluid inbetween. The damper 8 is mounted to the arm 7 with its moving part and to the housing 2 with its fixed part. The damper 8 is intended to smoothen the movement of the clip device 3 from the first closed or locked position to the second released or opened position and vice versa.

Figure 3:
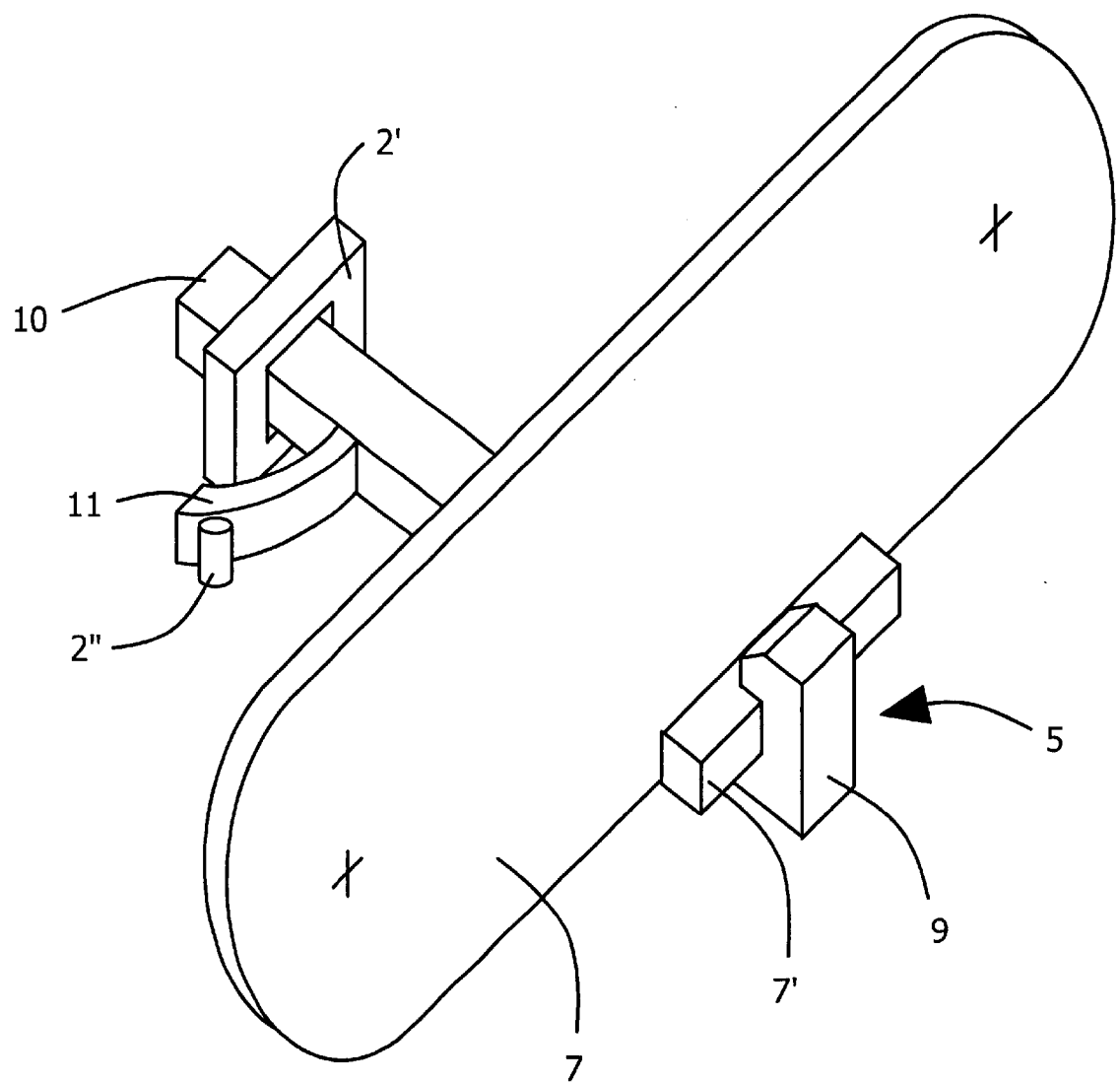
FIG. 3 is a partial perspective view of a locking device for the clip device in its locking/holding position.
Figure 4:
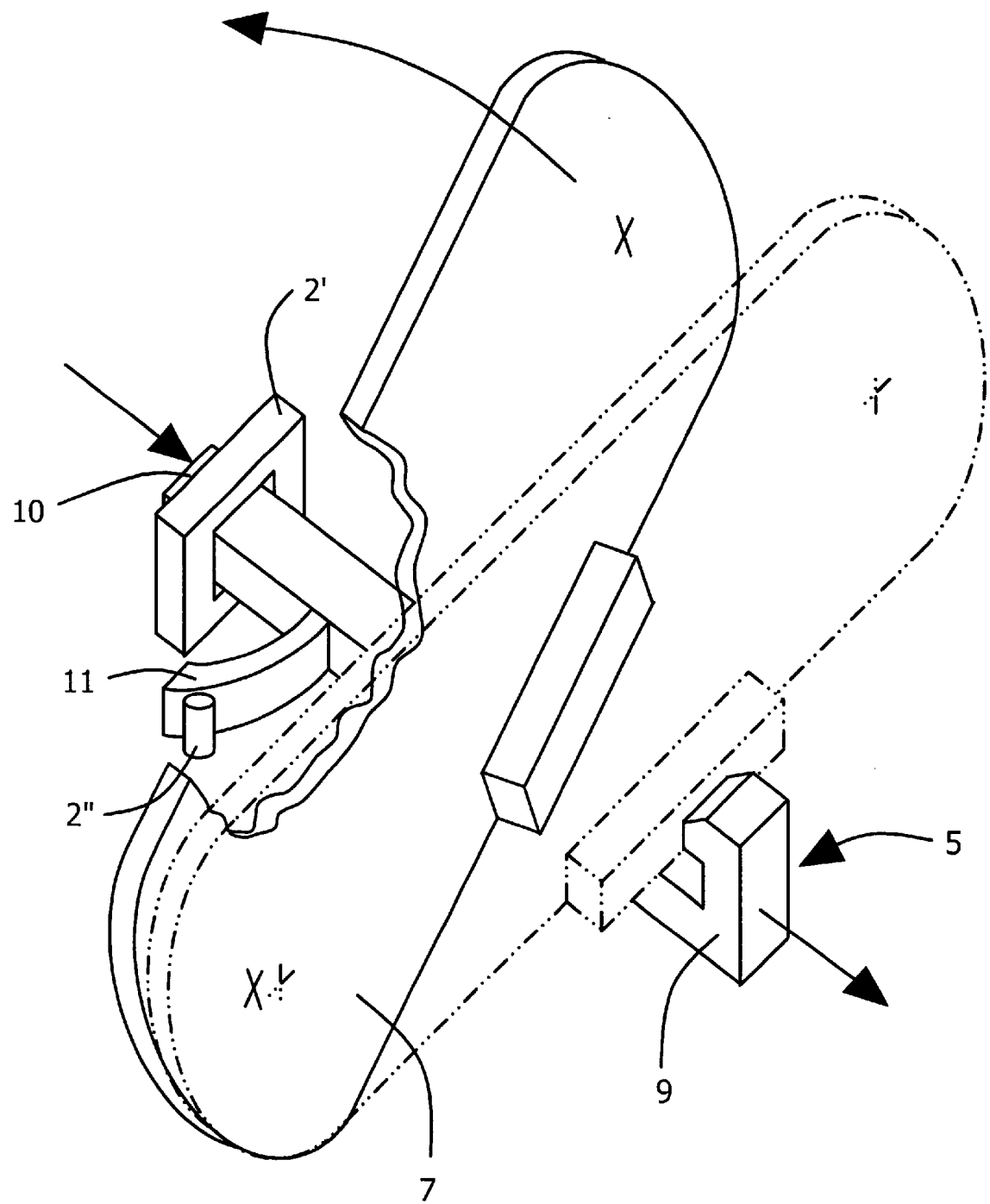
FIG. 4 is a partial perspective view of the locking device in its releasing position.

FIGS. 3 and 4 show the locking device 5 in its two positions. For clarity, just the arm 7 of the clip device 3. that is held by the locking device 5 is shown. FIG. 3 shows the locking device 5 when it holds the arm 7 in the closed or locked position shown in FIG. 1. A latch 9 of the locking device 5 is placed adjacent the arm 7, as can be seen in FIG. 3. Latch 9 is arranged on an actuating rod 10 at the inside of the arm 7. The rod 10 protrudes out of the housing 2, here shown as a housing portion 2', and works as a release mechanism for the clip device 3, accessible to a user. The rod 10 has a resilient part 11 engaging a housing pin 2" and acting as a return spring for the rod 10. This means that the arm 7 with an attachment 7' can be held in position by the latch 9 and that the release rod 10 gives a resistance when being pressed by a user.

In FIG. 4 the locking device 5 is in its releasing position. The release rod 10 has been pressed and the latch 9 has moved in the direction of the right arrow near the latch 9, whereby the arm attachment 7' slides out of the latch 9 and releases the arm 7 that moves in the direction of the arrow near the upper part of the arm 7. The arm 7 rotates to the position shown in FIG. 2 after it has been released.

When the clip device 3 is manually returned to its closed position in FIG. 1 after usage, the latch 9 will automatically engage the arm attachment 7' under the action of the flexible rod part 11.

Modifications regarding the spring 6 are possible, for example, other locations and types of springs can give the same biasing function as described above, e g a helical spring mounted prestressed in a longitudinal direction between the left end of the clip 4 and the arm 7 or a spring blade, which is also attached with a prestress between the left end of the clip 4 and the arm 7, creates the same function and moves both the clip 4 and the arm 7 during the release movement of the clip device 3.

What is claimed is:

1. An accessory for a portable apparatus having a housing, the accessory comprising:

a retractable clip device, accessible to a user, for detachable attachment of the portable apparatus to an external object, wherein the clip device includes a clip and an arm, the arm being at a lower end pivotally connected to the housing and at an upper end pivotally connected to the clip; and a bias device for the clip device that creates a clamping force when the portable apparatus is attached to the object, wherein the bias device includes a spring and is arranged at the pivotal connection between the clip and the arm for biasing the clip into contact with the portable apparatus.

2. The accessory of claim 1, wherein the arm is attached to the bottom of a cavity in the housing, in which cavity the arm is placed in its entirety when the clip device is retracted, whereby the cavity is covered by the clip and a substantially even exterior to the housing is formed, the arm being in abutment with a side edge of the cavity when the clip device is not retracted.

3. The accessory of claim 2, wherein further comprising a damper that is disposed at the pivotal connection between the lower end of the arm and the housing.

4. The accessory of claim 2, wherein the clip device further includes a locking device for releasably locking the clip device in a retracted position.

5. The accessory of claim 1, wherein the portable apparatus is a radio telephone.

6. A portable apparatus, comprising a housing and an accessory according to claim 1.

\* \* \* \* \*

UNITED STATES PATENT AND TRADEMARK OFFICE
CERTIFICATE OF CORRECTION

PATENT NO.    : 6,481,058 B1
DATED         : November 19, 2002
INVENTOR(S)   : Erik Möster et al.

It is certified that error appears in the above-identified patent and that said Letters Patent is hereby corrected as shown below:

<u>Title page,</u>
Item [75], the residence of the last named inventor Fredrik Palmqvist is mispelled. The city is spelled -- Staffanstorp --.

Signed and Sealed this

Tenth Day of February, 2004

JON W. DUDAS
*Acting Director of the United States Patent and Trademark Office*